(12) United States Patent  
Credelle

(10) Patent No.: US 8,456,496 B2  
(45) Date of Patent: *Jun. 4, 2013

(54) COLOR FLAT PANEL DISPLAY SUB-PIXEL ARRANGEMENTS AND LAYOUTS FOR SUB-PIXEL RENDERING WITH SPLIT BLUE SUB-PIXELS

(75) Inventor: Thomas Lloyd Credelle, Morgan Hill, CA (US)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,143

(22) Filed: Mar. 12, 2012

(65) Prior Publication Data

US 2012/0176428 A1 Jul. 12, 2012

Related U.S. Application Data

(60) Continuation of application No. 12/189,462, filed on Aug. 11, 2008, now Pat. No. 8,134,583, which is a division of application No. 10/278,352, filed on Oct. 22, 2002, now Pat. No. 7,417,648.

(60) Provisional application No. 60/346,738, filed on Jan. 7, 2002.

(51) Int. Cl.  
*G09G 5/02* (2006.01)

(52) U.S. Cl.  
USPC ............................ 345/694; 345/695; 349/106

(58) Field of Classification Search  
USPC ......... 345/72, 83, 88, 204, 695; 349/106–109  
See application file for complete search history.

(56) References Cited

U.S. PATENT DOCUMENTS

| 3,971,065 | A | | 7/1976 | Bayer |
| 4,353,062 | A | | 10/1982 | Lorteije et al. |
| 4,491,863 | A | * | 1/1985 | Kurahashi ..................... 348/799 |
| 4,593,978 | A | | 6/1986 | Mourey et al. |
| 4,632,514 | A | | 12/1986 | Ogawa et al. |
| 4,642,619 | A | | 2/1987 | Togashi |
| 4,651,148 | A | | 3/1987 | Takeda et al. |
| 4,751,535 | A | | 6/1988 | Myers |
| 4,773,737 | A | | 9/1988 | Yokono et al. |
| 4,786,964 | A | | 11/1988 | Plummer et al. |

(Continued)

FOREIGN PATENT DOCUMENTS

| DE | 197 46 329 A1 | 3/1999 |
| DE | 199 23 527 | 11/2000 |

(Continued)

OTHER PUBLICATIONS

Adobe Systems, Inc., website, http://www.adobe.com/products/acrobat/cooltype.html.

(Continued)

*Primary Examiner* — Amare Mengistu  
*Assistant Examiner* — Dmitriy Bolotin  
(74) *Attorney, Agent, or Firm* — Innovation Counsel LLP

(57) ABSTRACT

Various embodiments of a sub-pixel octal grouping are disclosed. The octal grouping may comprise three-color (red, green and blue) sub-pixels with blue colored subpixel comprising twice the number of positions within the octal sub-pixel grouping as the red and green colored sub-pixels. Various embodiments for performing sub-pixel rendering on the sub-pixel groupings are disclosed.

8 Claims, 21 Drawing Sheets

U.S. PATENT DOCUMENTS

| | | |
|---|---|---|
| 4,792,728 A | 12/1988 | Chang et al. |
| 4,800,375 A | 1/1989 | Silverstein et al. |
| 4,822,142 A | 4/1989 | Yasui |
| 4,853,592 A | 8/1989 | Strathman |
| 4,874,986 A | 10/1989 | Menn et al. |
| 4,886,343 A | 12/1989 | Johnson |
| 4,908,609 A | 3/1990 | Stroomer |
| 4,920,409 A * | 4/1990 | Yamagishi ............... 348/791 |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,052,785 A | 10/1991 | Takimoto et al. |
| 5,083,853 A | 1/1992 | Ueki et al. |
| 5,113,274 A | 5/1992 | Takahashi et al. |
| 5,132,674 A | 7/1992 | Bottorf |
| 5,142,392 A | 8/1992 | Ueki et al. |
| 5,144,288 A | 9/1992 | Hamada et al. |
| 5,196,924 A | 3/1993 | Lumelsky et al. |
| 5,233,385 A | 8/1993 | Sampsell |
| 5,311,205 A | 5/1994 | Hamada et al. |
| 5,311,337 A | 5/1994 | McCartney et al. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |
| 5,450,216 A | 9/1995 | Kasson |
| 5,461,503 A * | 10/1995 | Deffontaines et al. ........ 349/109 |
| 5,477,240 A | 12/1995 | Huebner et al. |
| 5,485,293 A * | 1/1996 | Robinder ................. 345/88 |
| 5,535,028 A | 7/1996 | Bae et al. |
| 5,541,653 A | 7/1996 | Peters et al. |
| 5,561,460 A | 10/1996 | Katoh et al. |
| 5,563,621 A * | 10/1996 | Silsby ................. 345/43 |
| 5,579,027 A | 11/1996 | Sakurai et al. |
| 5,648,793 A | 7/1997 | Chen |
| 5,754,226 A | 5/1998 | Yamada et al. |
| 5,757,452 A | 5/1998 | Masaki et al. |
| 5,773,927 A | 6/1998 | Zimlich |
| 5,792,579 A | 8/1998 | Phillips |
| 5,815,101 A | 9/1998 | Fonte |
| 5,821,913 A | 10/1998 | Mamiya |
| 5,856,050 A | 1/1999 | Inoue et al. |
| 5,877,512 A | 3/1999 | Kim |
| 5,899,550 A | 5/1999 | Masaki |
| 5,917,556 A * | 6/1999 | Katayama ................ 348/655 |
| 5,949,496 A | 9/1999 | Kim |
| 5,973,664 A | 10/1999 | Badger |
| 5,991,438 A | 11/1999 | Shaked et al. |
| 5,998,922 A * | 12/1999 | Ozawa et al. .............. 313/495 |
| 6,002,446 A | 12/1999 | Eglit |
| 6,005,582 A | 12/1999 | Gabriel et al. |
| 6,008,868 A | 12/1999 | Silverbrook |
| 6,023,315 A | 2/2000 | Harrold et al. |
| 6,034,666 A | 3/2000 | Kanai et al. |
| 6,038,031 A | 3/2000 | Murphy |
| 6,049,626 A | 4/2000 | Kim |
| 6,061,533 A | 5/2000 | Kajiwara |
| 6,064,363 A | 5/2000 | Kwon |
| 6,069,670 A | 5/2000 | Borer |
| 6,072,272 A | 6/2000 | Rumbaugh |
| 6,072,445 A | 6/2000 | Spitzer et al. |
| 6,075,905 A | 6/2000 | Herman et al. |
| 6,097,367 A | 8/2000 | Kuriwaki et al. |
| 6,108,122 A | 8/2000 | Ulrich et al. |
| 6,115,092 A | 9/2000 | Greene et al. |
| 6,137,560 A | 10/2000 | Utsumi et al. |
| 6,144,352 A | 11/2000 | Matsuda et al. |
| 6,160,535 A | 12/2000 | Park |
| 6,184,903 B1 | 2/2001 | Omori |
| 6,188,385 B1 | 2/2001 | Hill et al. |
| 6,198,507 B1 * | 3/2001 | Ishigami ................. 348/273 |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,252,218 B1 * | 6/2001 | Chou ................. 250/208.1 |
| 6,271,891 B1 | 8/2001 | Ogawa et al. |
| 6,278,434 B1 | 8/2001 | Hill et al. |
| 6,299,329 B1 | 10/2001 | Mui et al. |
| 6,326,981 B1 * | 12/2001 | Mori et al. .............. 345/695 |
| 6,327,008 B1 | 12/2001 | Fujiyoshi |
| 6,340,994 B1 | 1/2002 | Margulis et al. |
| 6,348,929 B1 | 2/2002 | Acharya et al. |
| 6,356,278 B1 | 3/2002 | Stamm et al. |
| 6,360,023 B1 | 3/2002 | Betrisey et al. |
| 6,377,262 B1 | 4/2002 | Hitchcock et al. |
| 6,385,466 B1 | 5/2002 | Hirai et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,429,867 B1 | 8/2002 | Deering |
| 6,441,867 B1 | 8/2002 | Daly |
| 6,453,067 B1 | 9/2002 | Morgan et al. |
| 6,459,419 B1 * | 10/2002 | Matsubayashi ............... 345/156 |
| 6,466,618 B1 | 10/2002 | Messing et al. |
| 6,469,756 B1 | 10/2002 | Booth, Jr. |
| 6,469,766 B2 | 10/2002 | Waterman et al. |
| 6,486,923 B1 | 11/2002 | Maeshima et al. |
| 6,545,653 B1 | 4/2003 | Takahara et al. |
| 6,545,740 B2 | 4/2003 | Werner |
| 6,552,706 B1 * | 4/2003 | Ikeda et al. .............. 345/96 |
| 6,583,787 B1 | 6/2003 | Pfister et al. |
| 6,593,981 B1 | 7/2003 | Haim et al. |
| 6,600,495 B1 | 7/2003 | Boland et al. |
| 6,614,414 B2 | 9/2003 | De Haan et al. |
| 6,661,429 B1 | 12/2003 | Phan |
| 6,674,430 B1 | 1/2004 | Kaufman et al. |
| 6,674,436 B1 | 1/2004 | Dresevic et al. |
| 6,680,761 B1 | 1/2004 | Greene et al. |
| 6,681,053 B1 | 1/2004 | Zhu |
| 6,714,206 B1 | 3/2004 | Martin et al. |
| 6,738,526 B1 | 5/2004 | Betrisey et al. |
| 6,750,875 B1 | 6/2004 | Keely, Jr. et al. |
| 6,781,626 B1 | 8/2004 | Wang |
| 6,801,220 B2 | 10/2004 | Greier et al. |
| 6,804,407 B2 | 10/2004 | Weldy |
| 6,833,890 B2 | 12/2004 | Hong et al. |
| 6,836,300 B2 | 12/2004 | Choo et al. |
| 6,842,207 B2 | 1/2005 | Nishida et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,754 B2 | 6/2005 | Brown Elliott |
| 6,914,649 B2 * | 7/2005 | Liu ................. 349/109 |
| 6,927,754 B2 | 8/2005 | Lai |
| 6,928,196 B1 | 8/2005 | Bradley et al. |
| 6,930,676 B2 | 8/2005 | De Haan et al. |
| 6,937,217 B2 | 8/2005 | Klompenhouwer et al. |
| 6,950,156 B1 | 9/2005 | Yoshida |
| 6,989,876 B2 | 1/2006 | Song et al. |
| 7,110,012 B2 | 9/2006 | Messing et al. |
| 7,123,277 B2 | 10/2006 | Brown Elliott et al. |
| 7,129,955 B2 | 10/2006 | Motomura |
| 7,167,186 B2 | 1/2007 | Credelle et al. |
| 7,184,066 B2 | 2/2007 | Elliott et al. |
| 7,221,381 B2 | 5/2007 | Brown Elliott et al. |
| 7,397,455 B2 | 7/2008 | Elliott |
| 7,417,648 B2 * | 8/2008 | Credelle ................. 345/694 |
| 7,755,652 B2 | 7/2010 | Credelle et al. |
| 8,134,583 B2 * | 3/2012 | Credelle ................. 345/695 |
| 2001/0017515 A1 | 8/2001 | Kusunoki et al. |
| 2001/0040645 A1 | 11/2001 | Yamazaki |
| 2001/0048764 A1 | 12/2001 | Betrisey et al. |
| 2002/0012071 A1 | 1/2002 | Sun |
| 2002/0015110 A1 | 2/2002 | Brown Elliott |
| 2002/0017645 A1 | 2/2002 | Yamazaki et al. |
| 2002/0030780 A1 | 3/2002 | Nishida et al. |
| 2002/0054263 A1 | 5/2002 | Kim et al. |
| 2002/0093476 A1 | 7/2002 | Hill et al. |

| | | | |
|---|---|---|---|
| 2002/0118019 A1 | 8/2002 | Nomura | |
| 2002/0122160 A1 | 9/2002 | Kunzman | |
| 2002/0140831 A1* | 10/2002 | Hayashi | 348/272 |
| 2002/0149598 A1 | 10/2002 | Greier et al. | |
| 2002/0186229 A1 | 12/2002 | Brown Elliott | |
| 2002/0190648 A1 | 12/2002 | Bechtel et al. | |
| 2003/0011613 A1 | 1/2003 | Booth, Jr. | |
| 2003/0016310 A1 | 1/2003 | Lee et al. | |
| 2003/0034992 A1 | 2/2003 | Brown Elliott et al. | |
| 2003/0043567 A1 | 3/2003 | Hoelen et al. | |
| 2003/0071775 A1 | 4/2003 | Ohashi et al. | |
| 2003/0071826 A1 | 4/2003 | Goertzen | |
| 2003/0071943 A1 | 4/2003 | Choo et al. | |
| 2003/0072374 A1 | 4/2003 | Sohm | |
| 2003/0077000 A1 | 4/2003 | Blinn et al. | |
| 2003/0085906 A1 | 5/2003 | Elliott et al. | |
| 2003/0090581 A1 | 5/2003 | Credelle et al. | |
| 2003/0103058 A1 | 6/2003 | Elliott et al. | |
| 2003/0117423 A1 | 6/2003 | Brown Elliott | |
| 2003/0128225 A1 | 7/2003 | Credelle et al. | |
| 2003/0184571 A1 | 10/2003 | Hirayama | |
| 2003/0218614 A1 | 11/2003 | Lavelle et al. | |
| 2003/0218618 A1* | 11/2003 | Phan | 345/629 |
| 2004/0021804 A1 | 2/2004 | Hong et al. | |
| 2004/0051724 A1 | 3/2004 | Elliott et al. | |
| 2004/0061710 A1 | 4/2004 | Messing et al. | |
| 2004/0075764 A1 | 4/2004 | Law et al. | |
| 2004/0080479 A1 | 4/2004 | Credelle | |
| 2004/0085495 A1 | 5/2004 | Roh et al. | |
| 2004/0095521 A1 | 5/2004 | Song et al. | |
| 2004/0108818 A1 | 6/2004 | Cok et al. | |
| 2004/0114046 A1 | 6/2004 | Lee et al. | |
| 2004/0150651 A1 | 8/2004 | Phan | |
| 2004/0169807 A1 | 9/2004 | Rho et al. | |
| 2004/0174380 A1 | 9/2004 | Credelle et al. | |
| 2004/0174389 A1 | 9/2004 | Ben-David et al. | |
| 2004/0179160 A1 | 9/2004 | Rhee et al. | |
| 2004/0189643 A1 | 9/2004 | Frisken et al. | |
| 2004/0196297 A1 | 10/2004 | Elliott et al. | |
| 2004/0213449 A1 | 10/2004 | Safee-Rad et al. | |
| 2004/0239813 A1 | 12/2004 | Klompenhouwer | |
| 2004/0239837 A1 | 12/2004 | Hong et al. | |
| 2004/0246213 A1* | 12/2004 | Credelle et al. | 345/87 |
| 2004/0246278 A1* | 12/2004 | Elliott | 345/692 |
| 2004/0246280 A1* | 12/2004 | Credelle et al. | 345/692 |
| 2004/0246381 A1* | 12/2004 | Credelle | 348/692 |
| 2004/0246404 A1* | 12/2004 | Elliott et al. | 349/88 |
| 2004/0247070 A1 | 12/2004 | Ali et al. | |
| 2004/0263528 A1 | 12/2004 | Murdoch et al. | |
| 2005/0001856 A1 | 1/2005 | Sparre et al. | |
| 2005/0007327 A1 | 1/2005 | Elion et al. | |
| 2005/0024380 A1 | 2/2005 | Lin et al. | |
| 2005/0068477 A1 | 3/2005 | Shin et al. | |
| 2005/0083277 A1* | 4/2005 | Credelle | 345/87 |
| 2005/0083356 A1 | 4/2005 | Roh et al. | |
| 2005/0094871 A1 | 5/2005 | Berns et al. | |
| 2005/0099426 A1 | 5/2005 | Primerano et al. | |
| 2005/0140634 A1 | 6/2005 | Takatori | |
| 2005/0151752 A1* | 7/2005 | Phan | 345/589 |
| 2005/0162600 A1* | 7/2005 | Rho et al. | 349/139 |
| 2005/0169551 A1 | 8/2005 | Messing et al. | |

FOREIGN PATENT DOCUMENTS

| | | | |
|---|---|---|---|
| DE | 201 09 354 U1 | 9/2001 | |
| EP | 0 158 366 A2 | 10/1985 | |
| EP | 0 203 005 A1 | 11/1986 | |
| EP | 0 322 106 A2 | 6/1989 | |
| EP | 0 361 981 A2 | 4/1990 | |
| EP | 0 453 033 A2 | 10/1991 | |
| EP | 0 671 650 A2 | 9/1995 | |
| EP | 0 793 214 A1 | 2/1996 | |
| EP | 0 812 114 A1 | 12/1997 | |
| EP | 0 878 969 A3 | 11/1998 | |
| EP | 0 899 604 A2 | 3/1999 | |
| EP | 0899604 A2 * | 3/1999 | 345/695 |
| EP | 1 083 539 A2 | 3/2001 | |
| EP | 1 261 014 A2 | 11/2002 | |
| EP | 1 308 923 A1 | 5/2003 | |
| GB | 2 133 912 A | 8/1984 | |
| GB | 2 146 478 A | 4/1985 | |
| GB | 2 282 928 A | 4/1995 | |
| JP | 1984-111196 A | 6/1984 | |
| JP | 60-107022 | 6/1985 | |
| JP | 62-127716 | 6/1987 | |
| JP | 02-000826 A | 1/1990 | |
| JP | 02-504324 | 12/1990 | |
| JP | 02-983027 B2 | 4/1991 | |
| JP | 03-78390 | 4/1991 | |
| JP | 03078390 | 4/1991 | |
| JP | 03-269567 | 12/1991 | |
| JP | 06-10253 | 4/1994 | |
| JP | 06-214250 | 8/1994 | |
| JP | 07-306656 | 11/1995 | |
| JP | 09-120431 | 5/1997 | |
| JP | 09-159992 | 6/1997 | |
| JP | 11-014978 | 1/1999 | |
| JP | 2004-004822 | 1/2004 | |
| JP | 2004-078218 | 3/2004 | |
| KR | 0259783 | 3/2000 | |
| WO | 00/21067 | 4/2000 | |
| WO | 00/42564 | 7/2000 | |
| WO | 00/42762 | 7/2000 | |
| WO | 00/45365 | 8/2000 | |
| WO | 00/67196 | 11/2000 | |
| WO | 00/70392 | 11/2000 | |
| WO | 01/10112 A2 | 2/2001 | |
| WO | 01/29817 A1 | 4/2001 | |
| WO | 01/52546 A2 | 7/2001 | |
| WO | 02/11112 A2 | 2/2002 | |
| WO | 02/059685 A2 | 8/2002 | |
| WO | 03/014819 A1 | 2/2003 | |
| WO | 03/050605 A1 | 2/2003 | |
| WO | 03/034380 A2 | 4/2003 | |
| WO | 03/056383 A1 | 7/2003 | |
| WO | 2004/017129 A1 | 2/2004 | |
| WO | 2004/021323 A2 | 3/2004 | |
| WO | 2004/027503 A1 | 4/2004 | |
| WO | 2004/086128 A1 | 10/2004 | |
| WO | 2005/057532 A2 | 6/2005 | |
| WO | 2005/050296 A1 | 6/2006 | |

OTHER PUBLICATIONS

Betrisey, C., et al., Displaced Filtering for Patterned Displays, SID Symp. Digest 1999, pp. 296-299.
Brown Elliott,C., "Active Matrix Display...", IDMC 2000, 185-189, Aug. 2000.
Brown Elliott, C., "Color Subpixel Rendering Projectors and Flat Panel Displays," SMPTE, Feb. 27-Mar. 1, 2003, Seattle, WA, pp. 1-4.
Brown Elliott, C., "Co-Optimization of Color AMLCD Subpixel Architecture and Rendering Algorithms," SID 2002 Proceedings Paper, May 30, 2002, pp. 172-175.
Brown Elliott, C., "Development of the PenTile Matrix Color AMLCD Subpixel Architecture and Rendering Algorithms," SID 2003, Journal Article.
Brown Elliott,C., "New Pixel Layout for PenTile Matrix Architecture," IDMC 2002, pp. 115-117.
Brown Elliott, C., "PenTile Matrix Displays and Drivers," ADEAC Proceedings Paper, Portland, OR, Oct. 2005.
Brown Elliott, C., "Reducing Pixel Count Without Reducint Image Quality," Information Display 12/99, vol. 1, pp. 22-25.
Carvajal, D., "Big Publishers Looking Into Digital Books," The NY Times, Apr. 3, 2000, Business/Financial Desk.
"ClearType magnified," Wired Magazine, Nov. 8, 1999, Microsoft Typography, article posted Nov. 8, 1999, 1 page.
Credelle, Thomas, "P-00: MTF of High-Resolution PenTile Matrix Displays," Eurodisplay 02 Digest, 2002, pp. 1-4.
Daly, Scott, "Analysis of Subtriad Addressing Algorithms by Visual System Models," SID Symp. Digest, Jun. 2000, pp. 1200-1203.
E-Reader Devices and Software, Jan. 1, 2001, Syllabus, http:://www.campus-technology.com/article.asp?id-419.
Feigenblatt, R.I., "Full-color imaging on amplitude-quantized color mosaic displays," SPIE, 1989, pp. 199-204.
Feigenblatt, Ron, "Remarkson Microsoft ClearType," http://www.geocities.com/SiliconValley/Ridge/6664/ClearType. html., Dec. 5, 1998; Dec. 7, 1998; Dec. 12, 1999; Dec. 26, 1999; Jun. 19, 2000, 30 pages.

Gibson, S., "Sub-Pixel Rendering; How it works," Gibson Research Corp., http://www.grc.com/ctwhat.html.

Johnston, Stuart, "An Easy Read: Microsoft's ClearType," InformationWeek Online, Redmond, WA, Nov. 23, 1998, 3 pages.

Johnston, Stuart, "Clarifying ClerType," InformationWeek Online, Redmong, WA, Jan. 4, 1999, 4 pages.

"Just Outta Beta," Wired Magazine, Dec. 1999, Issue 7-12, 3 pages.

Klompenhouwer, Michiel, "Subpixel Image Scaling for Color Matrix Displays," SID Symp. Digest, May 2002, pp. 176-179.

Michiel A. Klompenhouwer, Gerard de Haan, "Subpixel image scaling for color matrix displays," Journal of the Society for Information Display, vol. 11, Issue 1, Mar. 2003, pp. 99-108.

Krantz, John, et al., "Color Matrix Display Image Quality: The Effects of Luminance . . . ," SID 90 Digest, pp. 29-32.

Lee, Baek-woon et al., "40.5L: Late-News Paper: TFT-LCE with RGBW Color System," SID 03 Digest, 2003, pp. 1212-1215.

Markoof, John, "Microsoft's Cleartype Sets off Debate on Originality," New York Times, Dec. 7, 1998, 5 pages.

Martin, R., et al., "Detectability of Reduced Blue-Pixel Count in Projection Displays," SID Symp. Digest, May 1993, pp. 606-609.

Messing, Dean, et al., "Improved Display Resolution of Subsampled Colour Images Using Subpixel Addressing," IEE ICIP 2002, vol. 1, pp. 625-628.

Messing, Dean, et al., Subpixel Rendering on Non-Striped Colour Matrix Displays, 203 International Conf. on Image Processing, Sep. 2003, Barcelona, Spain, 4 pages.

"Microsoft ClearType," website, Mar. 26, 2003, 4 pages.

Microsoft Crop. website, http://www.microsoft.com/typography/cleartype, 7 pages.

Microsoft press release, Microsoft Research Announces Screen Display Breakthrough at COMDEX/Fall '98; . . . Nov. 15, 1998.

Murch, M., "Visual Perception Basics," SID Seminar, 1987, Tektronix, Inc., Beaverton, Oregon.

Okumura, et al., "A New Flicker-Reduction Drive Method for High Resolution LCTVs," SID Digest, pp. 551-554, 2001.

Platt, John, "Optimal Filtering for Patterned Displays, IEEE Signal Processing Letters," 2000, 4 pages.

PCT International Search Report dated Jun. 3, 2002 for PCT/US02/12610 (U.S. Appl. No. 10/051,612).

PCT International Search Report dated Jul. 17, 2003 for PCT/US02/39859 (U.S. Appl. No. 10/278,393).

PCT International Search Report dated Jul. 30, 2003 for PCT/US02/39860 (U.S. Appl. No. 10/278,328).

PCT International Search Report dated Sep. 30, 2003 for PCT/US02/24994 (U.S. Appl. No. 10/215,843).

PCT International Search Report dated Jun. 14, 2004 for PCT/US03/28222 (U.S. Appl. No. 10/243,094).

PCT International Search Report dated Nov. 3, 2004 for PCT/US04/18036 (U.S. Appl. No. 10/696,236).

Poor, Alfred, "LCDs: The 800-pound Gorilla," Information Display, Sep. 2002, pp. 18-21.

Wandell, Brian A., Stanford University, "Fundamentals of Vision: Behavior . . . ," Jun. 12, 1994, Society for Information Display (SID) Short Course S-2, Fairmont Hotel, San Jose, California.

Werner, Ken, "OLEDS, OLEDS, Everywhere . . . ," Information Display. Sep. 2002, pp. 12-15.

* cited by examiner

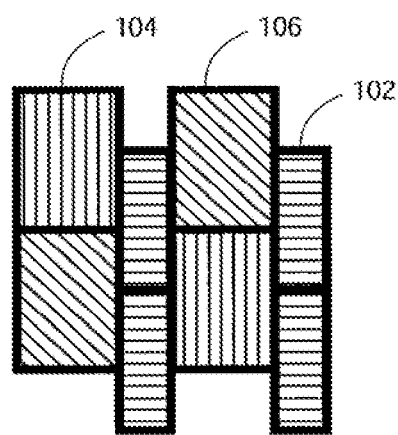 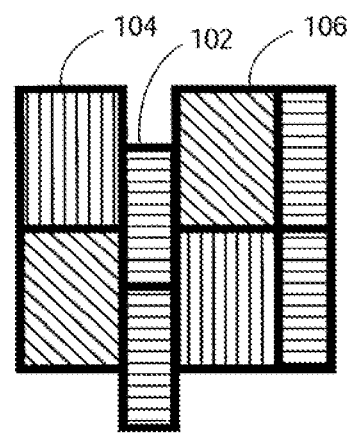
FIG. 18A  FIG. 18B

COLOR FLAT PANEL DISPLAY SUB-PIXEL ARRANGEMENTS AND LAYOUTS FOR SUB-PIXEL RENDERING WITH SPLIT BLUE SUB-PIXELS

RELATED APPLICATIONS

This application is a continuation of and claims priority to U.S. patent application Ser. No. 12/189,462, entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed on Aug. 11, 2008, (now U.S. Pat. No. 8,134,583, having an issue date of Mar. 13, 2012), which application is hereby incorporated by reference herein for all that it contains and teaches.

This application also claims priority to U.S. patent application Ser. No. 10/278,352, entitled "COLOR FLAT PANEL DISPLAY SUB-PIXEL ARRANGEMENTS AND LAYOUTS FOR SUB-PIXEL RENDERING WITH SPLIT BLUE SUB-PIXELS," filed on Oct. 22, 2002, issued as U.S. Pat. No. 7,417,648 on Aug. 26, 2008 and published as U.S. Patent Application Publication No. 2003/0128179 which claims priority to U.S. Provisional Patent Application No. 60/346,738 entitled "ARRANGEMENT OF SUBPIXELS WITH DOUBLE BLUE STRIPES," filed on Jan. 7, 2002, which applications are hereby incorporated by reference herein for all that they contain and teach.

BACKGROUND

The present application relates to improvements to display layouts, and, more particularly, to improved color pixel arrangements, means of addressing used in displays, and to data format conversion methods for these displays.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chromanance, and motion. Motion is only important for flicker threshold to the imaging system designer. The luminance channel takes the input from only the red and green receptors. In other words, the luminance channel is "color blind." It processes the information in such a manner that the contrast of edges is enhanced. The chromanance channel does not have edge contrast enhancement. Since the luminance channel uses and enhances every red and green receptor, the resolution of the luminance channel is several times higher than the chromanance channels. Consequently, the blue receptor contribution to luminance perception is negligible. The luminance channel thus acts as a resolution band pass filter. Its peak response is at 35 cycles per degree)(cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the horizontal axis is slightly higher than the vertical axis. The limit in the diagonal axes is significantly lower.

The chromanance channel is further subdivided into two sub-channels, to allow us to see full color. These channels are quite different from the luminance channel, acting as low pass filters. One can always tell what color an object is, no matter how big it is in our field of view. The red/green chromanance sub-channel resolution limit is at 8 cycles/°, while the yellow/blue chromanance sub-channel resolution limit is at 4 cycles/°. Thus, the error introduced by lowering the red/green resolution or the yellow/blue resolution by one octave will be barely noticeable by the most perceptive viewer, if at all, as experiments at Xerox and NASA, Ames Research Center (see, e.g., R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270µ) on a display. Thus, if the blue pixel pitch is less than half (625µ) of this blending pitch, the colors will blend without loss of picture quality. This blending effect is directly related to the chromanance sub-channel resolution limits described above. Below the resolution limit, one sees separate colors, above the resolution limit, one sees the combined color.

BRIEF DESCRIPTION OF THE DRAWINGS

The accompanying drawings, which are incorporated in, and constitute a part of this specification illustrate various implementations and embodiments.

FIGS. 18A and 18B show other embodiments of the octal subpixel arrangement with various vertical displacements of the subpixel.

DETAILED DESCRIPTION

Reference will now be made in detail to various implementations and embodiments, examples of which are illustrated in the accompanying drawings. Wherever possible, the same reference numbers will be used throughout the drawings to refer to the same or like parts.

Figure 1:
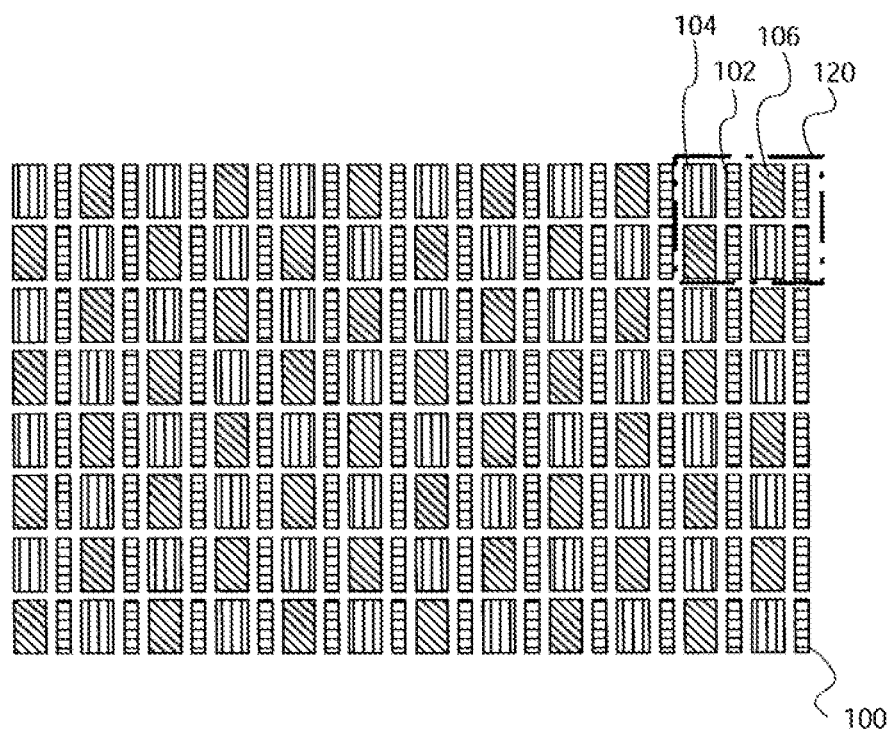
FIG. 1 shows an arrangement of sub-pixel emitters comprising threes colors—red, green, and blue—in groupings that create a larger rectilinearly repeating cell group of eight sub-pixels wherein the blue sub-pixels are "split".

In FIG. 1, in the arrangement of sub-pixel emitters 100, there are three-color emitters in groupings 120 that create a larger rectilinearly repeating cell group of eight sub-pixels. This layout was introduced in the '738 provisional application and included herein by reference. Grouping 120 comprises red sub-pixels 104, green sub-pixels 106 and blue sub-pixels 102. As may be seen, blue sub-pixels 102 are "split"—i.e. having a smaller width along the horizontal axis than either red or green sub-pixels but doubled in number per grouping or repeat cell. Such a "split" sub-pixel can refer to a sub-pixel having a smaller area than a non-split sub-pixel. Splitting the blue sub-pixels helps in breaking up the noticeable effect of visible vertical blue stripes down the display, as further discussed in United States Patent Publication No. 2003/0117423 ("the '423 application") also identified as: U.S. patent application Ser. No. 10/278,328 originally entitled "IMPROVEMENTS TO COLOR FLAT PANEL DISPLAY SUBPIXEL ARRANGEMENTS AND LAYOUTS WITH REDUCED BLUE LUMINANCE WELL VISIBILITY," filed on Oct. 22, 2002, and incorporated by reference.

As may additionally be seen in FIG. 1, the red and the green sub-pixels are placed upon a "checkerboard" pattern with the repeat cell itself. As discussed further in the '225 application, it may be desirable to alter the repeat cell grouping 120 color assignments to have a split green sub-pixel in position of sub-pixels 102 and have the remaining red and blue sub-pixels form the checkerboard pattern. Likewise, it might be desirable to have the red sub-pixels split and the green and blue sub-pixels on a checkerboard pattern. The alternating "checkerboard" of emitters is similar to the red and green "checkerboard" that was disclosed in co-pending and commonly assigned United States Patent Publication No. 2002/0015110 ("the '110 application"), also identified as: U.S. patent application Ser. No. 09/916,232, originally entitled "ARRANGEMENT OF COLOR PIXELS FOR FULL COLOR IMAGING DEVICES WITH SIMPLIFIED ADDRESSING," filed on Jul. 25, 2001, which is hereby incorporated herein by reference.

It should be appreciate that while FIG. 1 depicts the "split" blue subpixel as narrower than either the red or the green subpixels, another embodiment of the present invention employs blue subpixels of equal area dimensions to the red and green subpixels. To achieve a pleasing white point with all subpixels on in a logical pixel, the relative intensities of the red, green and blue emitters can be changed appropriately as discussed in co-pending and commonly assigned United States Patent Publication No. 2004/0051724 ("the '724 application"), also identified as: U.S. patent application Ser. No. 10/243,094, originally entitled "IMPROVED FOUR COLOR ARRANGEMENTS OF EMITTERS FOR SUB-PIXEL RENDERING," filed Sep. 13, 2002, which is hereby incorporated herein by reference.

As shown in FIG. 1, the subpixels appear to have a substantially rectangular appearance. It should be appreciated that other shapes to the subpixels are also possible and are contemplated within the scope of the present invention. For example, a multitude of other regular or irregular shapes for the subpixels are possible and are desirable if manufacturable. It suffices only that there is an octal grouping of colored subpixels in the fashion herein described that may be addressable for the purposes of subpixel rendering (SPR).

As subpixel shapes may vary under the scope of the present invention, so too may the exact positions of the subpixels be varied under the scope of the present invention. For example, FIGS. 18A and 18B depict a similar octal subpixel grouping wherein one or both of the majority stripes 102 are offset (relatively or otherwise) from the other subpixels 104 and 106. Other vertical offsets are also possible.

Figure 19A:
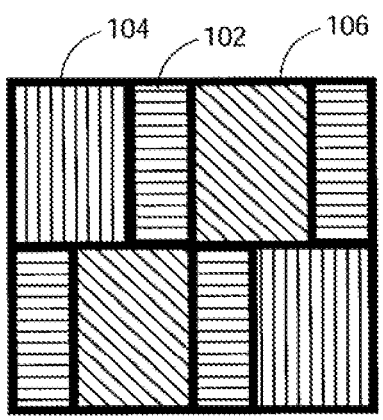
FIGS. 19A and 19B show yet other embodiments of the octal subpixel arrangement of various displacements of the split majority subpixel within the subpixel grouping.
Figure 19B:
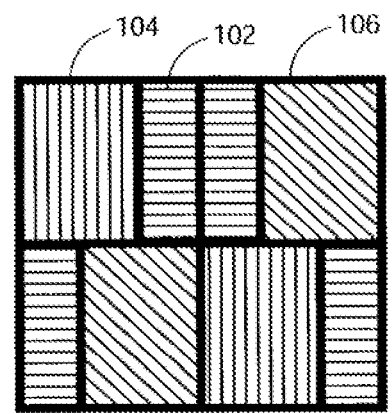

Other embodiments of the octal groupings are also possible. FIGS. 19A and 19B depict octal groupings wherein the majority subpixels 102 are interspersed within the checkerboard of subpixels 104 and 106. Other arrangements of majority subpixel placement within such a checkerboard are also possible and are contemplated within the scope of the present invention.

FIGS. 19A and 19B may have column electrodes that zig-zag across the display. Column driver savings should be one third when compared to the RGB stripe system with the same resolution and the number of subpixels are about two thirds of the number of subpixels when compared to the RGB stripe system.

Yet other embodiments of the present invention are possible. For example, the entire octal subpixel groupings may be rotated 90 degrees to reverse the roles of row and column driver connections to the grouping. Such a horizontal arrangement for subpixels is further disclosed in the co-pending and commonly assigned application United States Patent Publication No. 2003/0090581 ("the '581 application"), also identified as U.S. patent application Ser. No. 10/278,393, filed Oct. 22, 2002, originally entitled "COLOR DISPLAY HAVING HORIZONTAL SUB-PIXEL ARRANGEMENTS AND LAYOUTS," incorporated by reference.

The alternating "checkerboard" of emitters is similar to the red and green "checkerboard" that was disclosed in co-pending United States Patent Publication No. 2002/0015110, also identified as U.S. patent application Ser. No. 09/916,232 ("the '232 application"), originally entitled "ARRANGEMENT OF COLOR PIXELS FOR FULL COLOR IMAGING DEVICES WITH SIMPLIFIED ADDRESSING," filed on Jul. 25, 2001 and hereby incorporated herein by reference.

With the display comprised substantially of repeat cell 120 having the blue sub-pixel split as sub-pixel 102, it is possible to perform sub-pixel rendering upon this display using the area resampling techniques as described in United States Patent Publication No. 2003/0103058, also identified as U.S. patent application Ser. No. 10/150,355 ("the '355 application"), originally entitled "METHODS AND SYSTEMS FOR SUB-PIXEL RENDERING WITH GAMMA ADJUSTMENT," filed on May 17, 2002, which is hereby incorporated herein by reference and is commonly owned by the same assignee of this application. One such embodiment of area resampling is shown in FIGS. 2 through 7.

Figure 2:
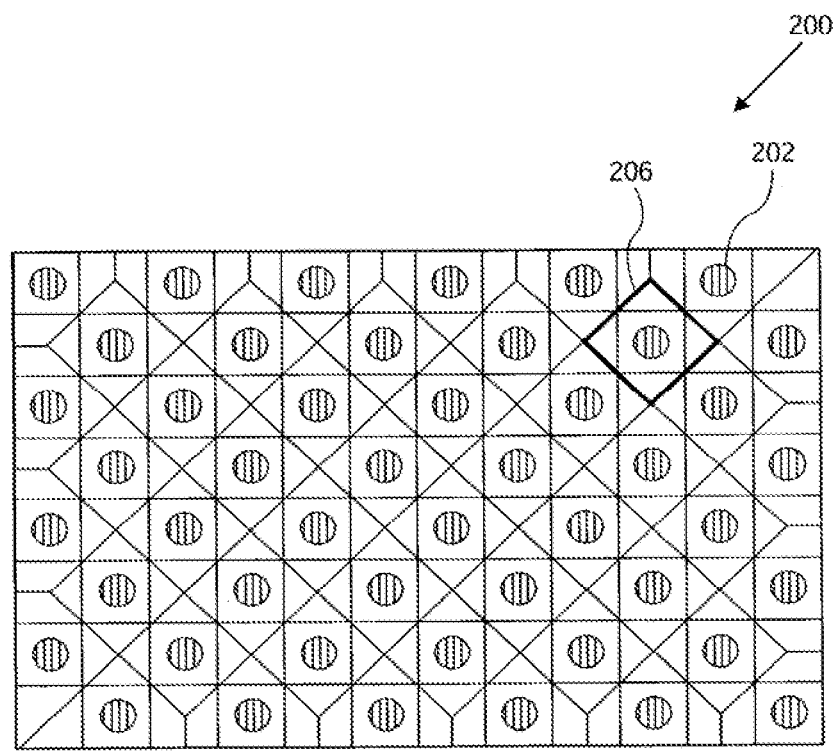
FIGS. 2, 3 and 4 illustrate one embodiment of red, green, and blue resample area arrays for the red, green and blue color planes respectively to match the sub-pixel arrangement of FIG. 1.
Figure 3:
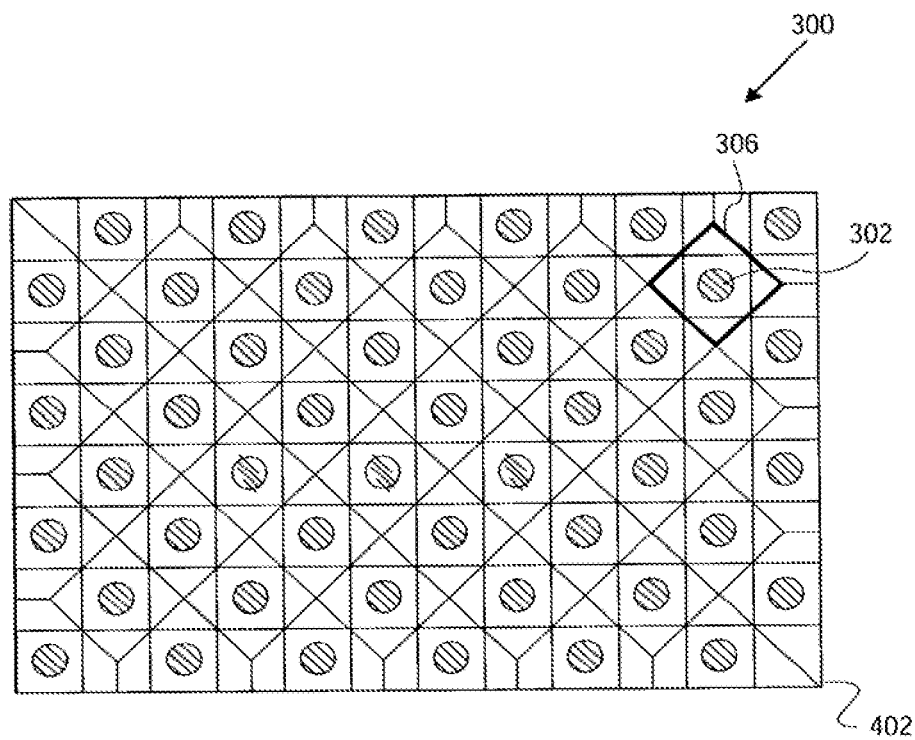
Figure 4:
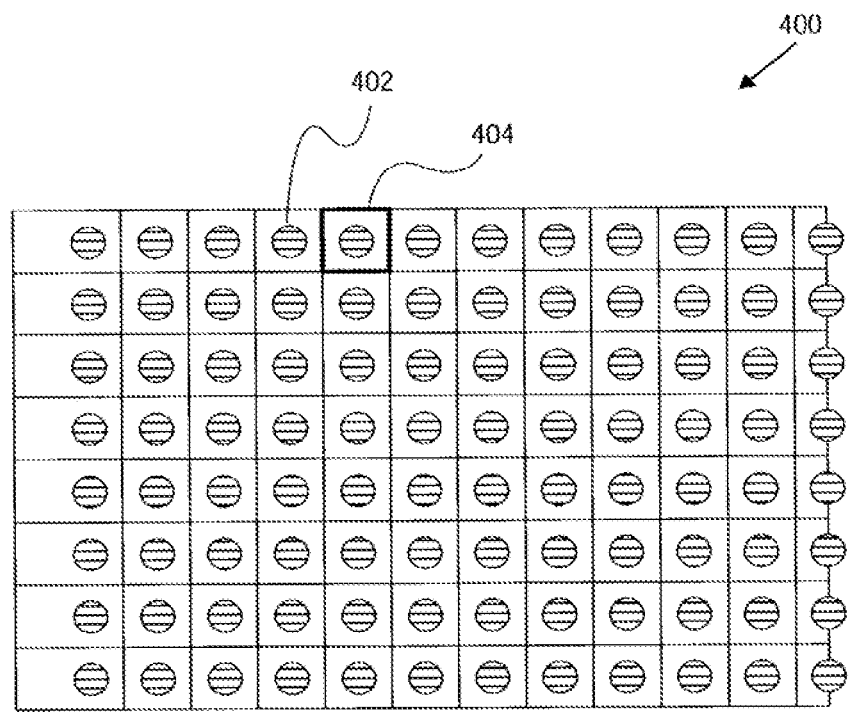

FIGS. 2, 3 and 4 illustrate red 200, green 300, and blue 400 resample area arrays for the red, green and blue color planes, respectively. It should be noted that each color resample area array 200, 300, and 400 comprises of resample areas 206, 306 and 404 and that each resample area has an associated resample point 202, 302 and 402, respectively. The resample points 202, 302, and 402 match the relative positions of the red 104, green 106 and blue 102 sub-pixel locations, respectively, within each color plane; but not necessarily their exact inter-color-plane-phase relationships. Any number of phase relationships are possible, a number of which have useful properties in given data format conversion cases.

Figure 5:
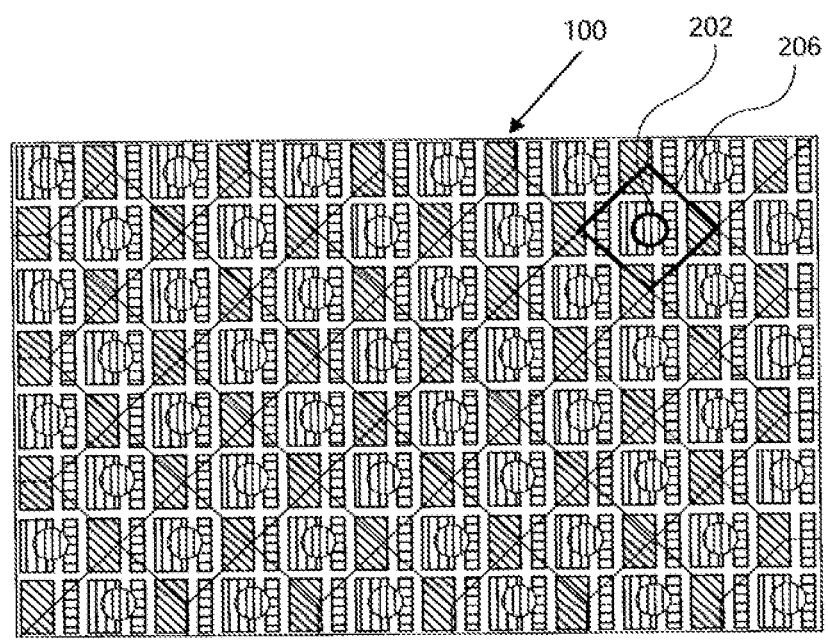
FIGS. 5 and 6 illustrate the red and green resample area arrays of FIGS. 2 and 3 overlaid on the sub-pixel arrangement of FIG. 1 respectively.
Figure 6:
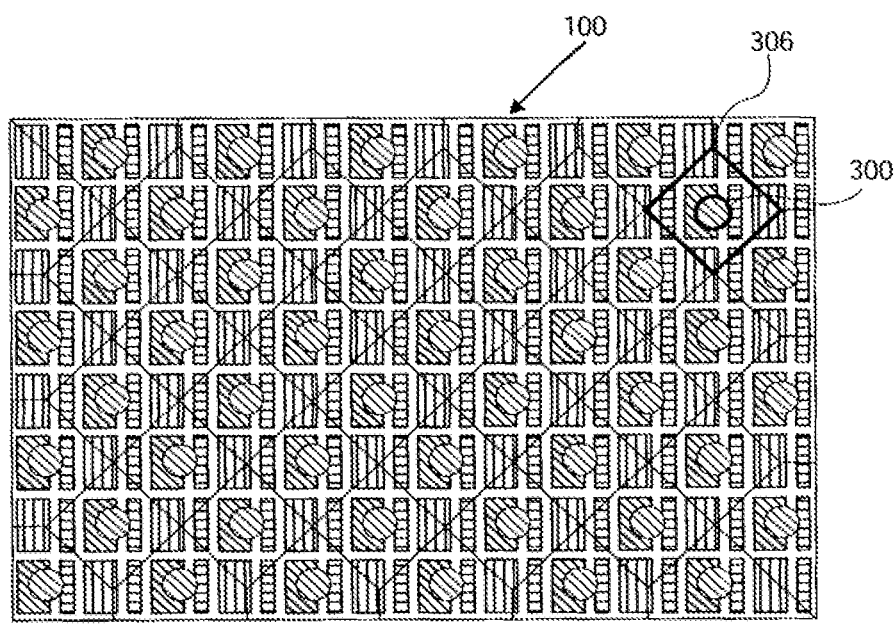
Figure 7:
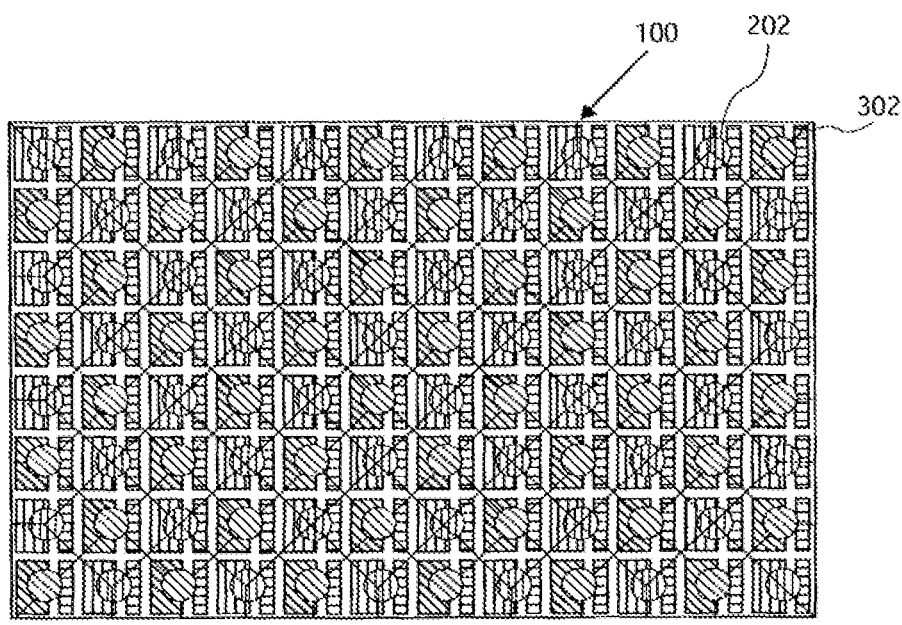
FIG. 7 illustrates one particular inter-color-plane-phase relationship between the red and green color resample areas overlaid on the sub-pixel arrangement of FIG. 1.

FIGS. 5 and 6 illustrate the red and green resample area arrays of FIGS. 2 and 3 overlaid on the sub-pixel arrangement 100 of FIG. 1, respectively. FIG. 7 illustrates one particular inter-color-plane-phase relationship between the red and green color resample areas overlaid on the sub-pixel arrangement 100. This particular intercolor-plane-phase relationship depicts converting the conventional fully converged square grid red-green-blue RGB format which is to be displayed "one-to-one" with the square blue 102 sub-pixel grid. In this inter-color-plane-phase relationship, the green 300, blue 400, and red 200 resample area arrays are positioned such that the red 202 and green 302 resample points overlap the blue 402 sample points. This treats the blue sub-pixels 102 as though they lay on top of, or intimately associated with, the red 104 and green 106 sub-pixel checkerboard.

Figure 11:
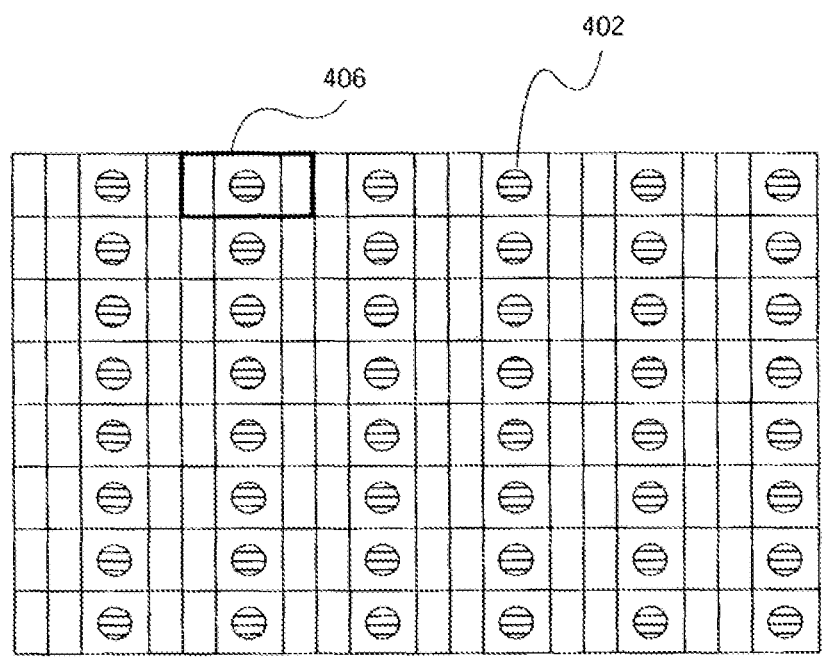
FIGS. 11 and 13 depict alternative blue color plane resample area arrays to replace the one shown in FIG. 4.
Figure 12:
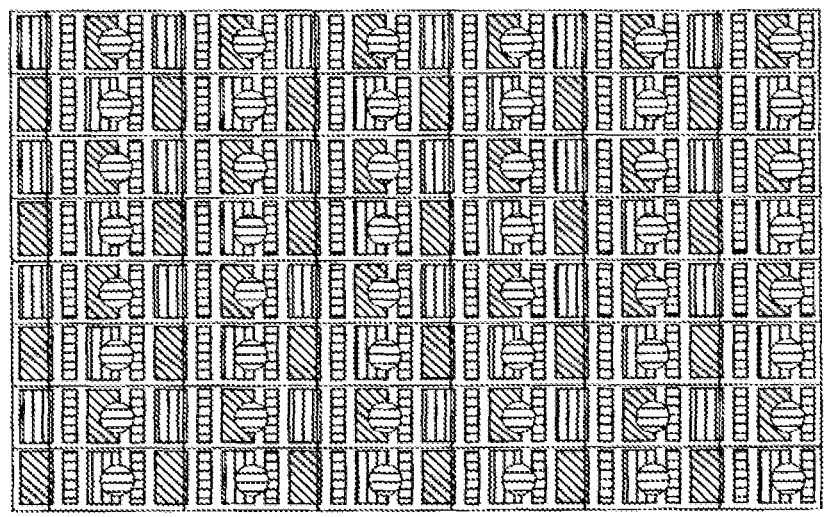
FIGS. 12 and 14 show how the respective blue color plane resample areas of FIGS. 11 and 13 would map onto the sub-pixel layout as shown in FIG. 1.
Figure 13:
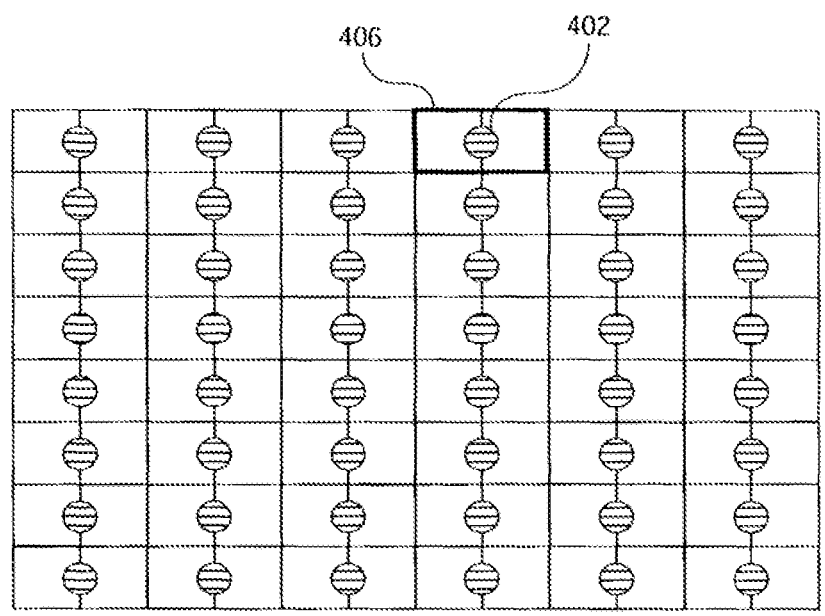
Figure 14:
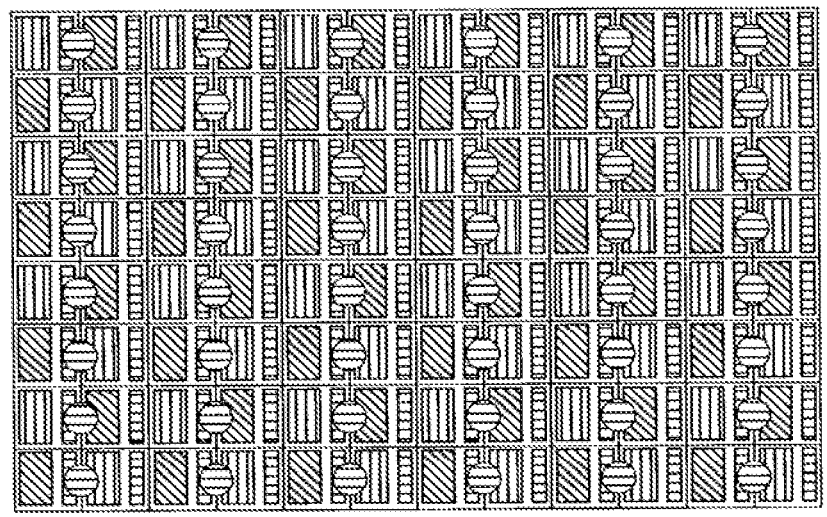

FIGS. 11 and 13 depict alternative blue color plane resample area arrays to replace the one shown in FIG. 4. FIGS. 12 and 14 show how these respective blue color plane resample area would map onto the sub-pixel layout as shown in FIG. 1. FIGS. 11 and 13 depict two different embodiments of resample areas 406 for blue with the phase shift shown. It should be appreciated that other phase shifts suffice for the purposes of the present invention. Additionally, other resample areas for the blue pixel data could be employed without departing from the scope of the present invention.

These Figures are merely illustrative and only serve to provide an understanding of the relationship between the resample points, reconstruction points, resample areas, and sub-pixel locations for this embodiment.

The sub-pixel rendering techniques as described in the '355 patent application can be used to convert the incoming data format to that suitable for the display. In such a case, the method proceeds as follows: (1) determining implied sample areas for each data point of incoming three-color pixel data; (2) determining the resample area for each color sub-pixel in the display; (3) forming a set of coefficients for each said resample area, the coefficients comprising fractions whose denominators are a function of the resample area and the numerators are a function of an area of each said implied sample areas that may partially overlap the resample areas; (4) multiplying the incoming pixel data for each implied sample area by the coefficient resulting in a product; (5) adding each product to obtain luminance values for each resample area.

Other sub-pixel rendering techniques are possible to employ with the various sub-pixel arrangements as disclosed herein. For example, the techniques known as "adaptive filtering" may be employed in the same fashion as described in United States Patent Publication No. 2003/0085906 ("the '906 application"), also identified as U.S. patent application Ser. No. 10/215,843, originally entitled "METHODS AND SYSTEMS FOR SUB-PIXEL RENDERING WITH ADAPTIVE FILTERING," filed on Aug. 8, 2002, which is hereby incorporated herein by reference and is commonly owned by the same assignee of this application. Adaptive filtering can be adopted so as not to require a 3×3 sample of input data, which uses a minimum of two lines of memory. The test may be based on a smaller sample of input data, for example 1×3 or 1×2 matrices. The input data is sampled to test for vertical or diagonal lines, dots and edges, or other high contrast features and then actions are taken, depending on the outcome of the tests.

Test masks may be used and compared to the image data to see if an edge is detected; if detected then take an appropriate action to the red and/or blue data—e.g. apply gamma or apply a new value or different filter coefficient. Otherwise, if no feature is detected, then no action may be taken.

Figure 17:
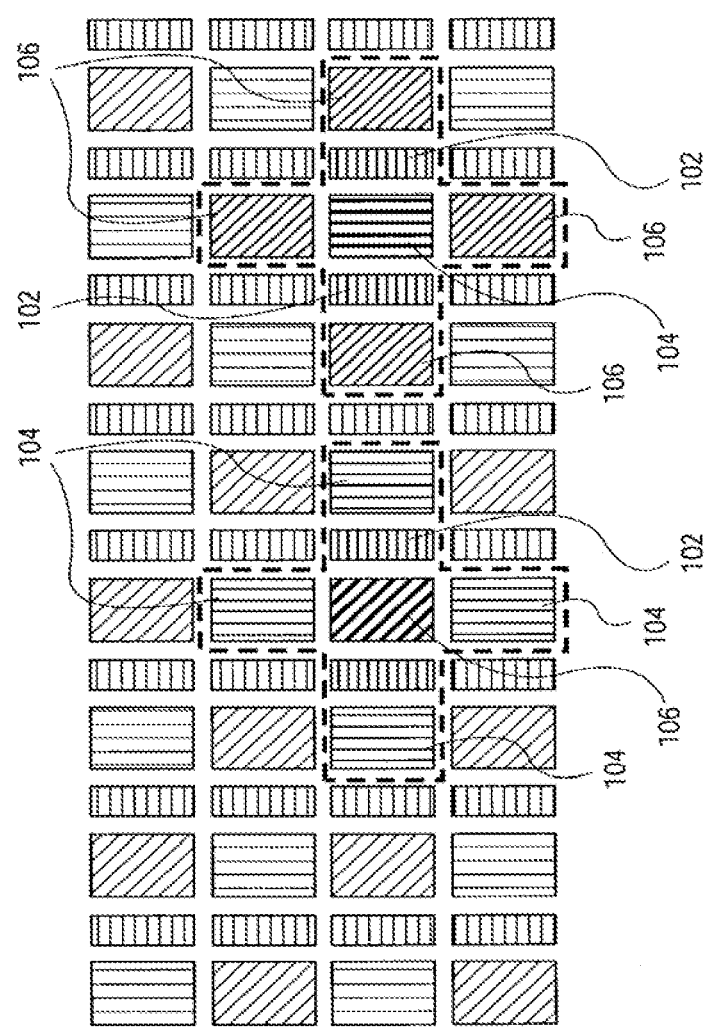
FIG. 17 illustrates the results of turning on two full color incoming data pixels.

FIG. 17 illustrates the results of turning on two full color incoming data pixels. The two pixels are converted to two clusters of sub-pixels, called "logical pixels", turned on at varying amplitudes. The logical pixel on the left is centered on or near a green sub-pixel 106. The logical pixel on the right is centered on or near a red sub-pixel 104. In both logical pixels, the various sub-pixels are turned on to the appropriate illumination such that a pleasing white color is formed and centered on the green and red sub-pixels, respectively.

Figure 8A:
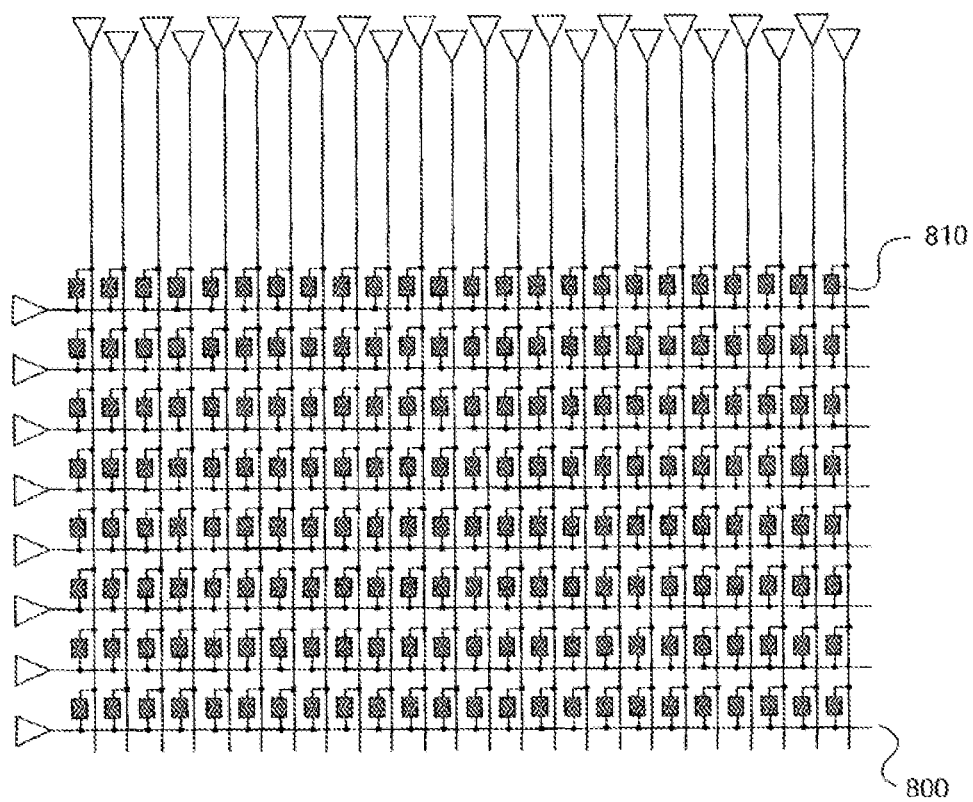
FIGS. 8A and 8B illustrate two possible schematics for a driver arrangement for the arrangement of color emitter sub-pixels in FIG. 1.
Figure 8B:
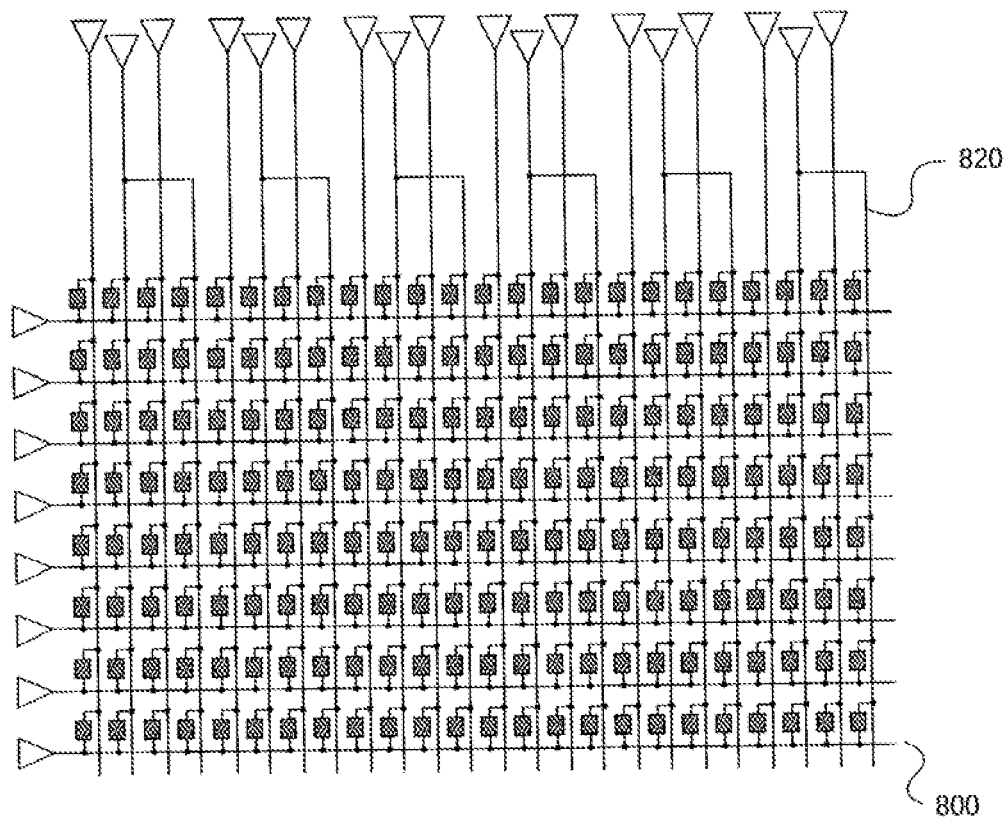

FIGS. 8A and 8B illustrate two possible schematics for a driver arrangement 800 for the arrangement of color emitter sub-pixels in FIG. 1. FIG. 8A shows a one to one correspondence of column drivers to columns in the display; however, with the split blue sub-pixels, it may be desirable to tie adjacent columns of split blue sub-pixels via connections 820. As may be seen in FIG. 8B, this scheme has the advantage of saving on the number of column drivers.

For convenience, these examples given have the same number of sub-pixels illustrated as FIG. 1. These drive arrangements may be used for a number of display technologies, as the blocks 810 may represent one or several electrical components. They may represent the capacitive display cell element for passively addressed Liquid Crystal Display (LCD), or ElectroLuminescent (EL) Display. It may represent the gaseous discharge element in a Plasma Display Panel (PDP). It may represent the semiconductor diode element of a passively Inorganic Light Emitting Diode or an Organic Light Emitting Diode Display. It may represent the transistor, storage capacitor, and capacitive cell element of an Active Matrix Liquid Crystal Display (AMLCD). It may represent the multi-transistor, storage capacitor, and light emitting element of an Active Matrix Organic Light Emitting Diode Display (AMOLED). It may represent, in general, the color sub-pixel and its associated electronic elements found in other known or yet to be invented display technologies.

Known drive timing and methods may be used for N×M drive matrices as those shown. However, there may be modifications needed due to the specific color assignments, particularly any checkerboard across the panel or color alternations within a single column. For example, the technique known in the art as Multi-Line Addressing for passive LCD may be modified such that groupings of rows are restricted to odd and even row combinations. This will reduce potential color cross talk since, within a column with two alternating color sub-pixels, only one color will be addressed at a time.

Figure 9:
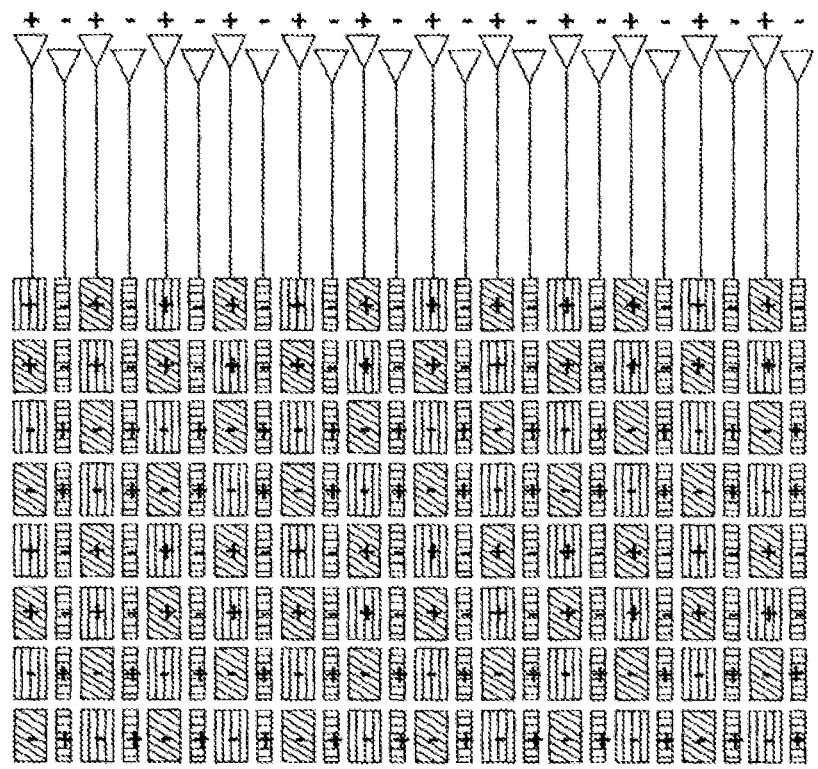
FIGS. 9 and 10 show two "dot inversion" schemes—commonly known as "2×1" and "1×1", respectively—matching FIG. 8A's schematic.
Figure 10:
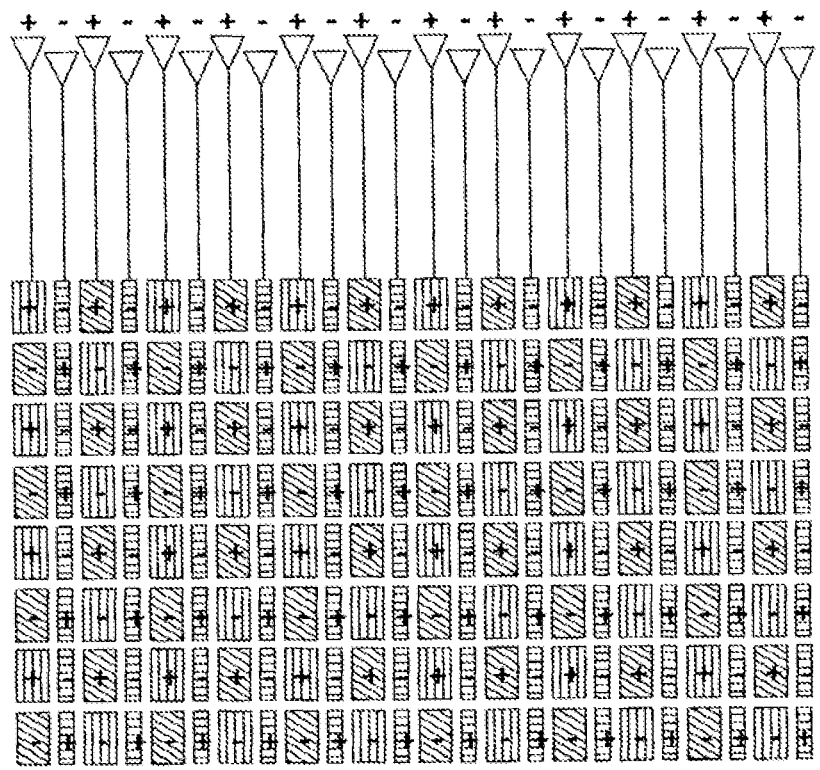
Figure 15:
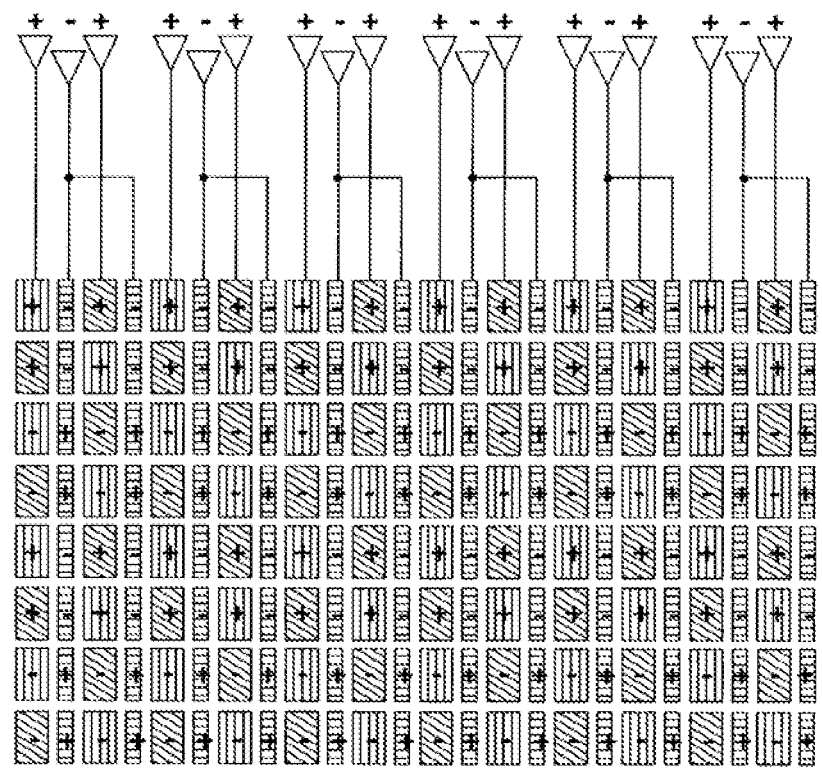
FIGS. 15 and 16 show two "dot inversion" schemes—commonly known as "2×1" and "1×1", respectively—matching FIG. 8B's schematic.
Figure 16:
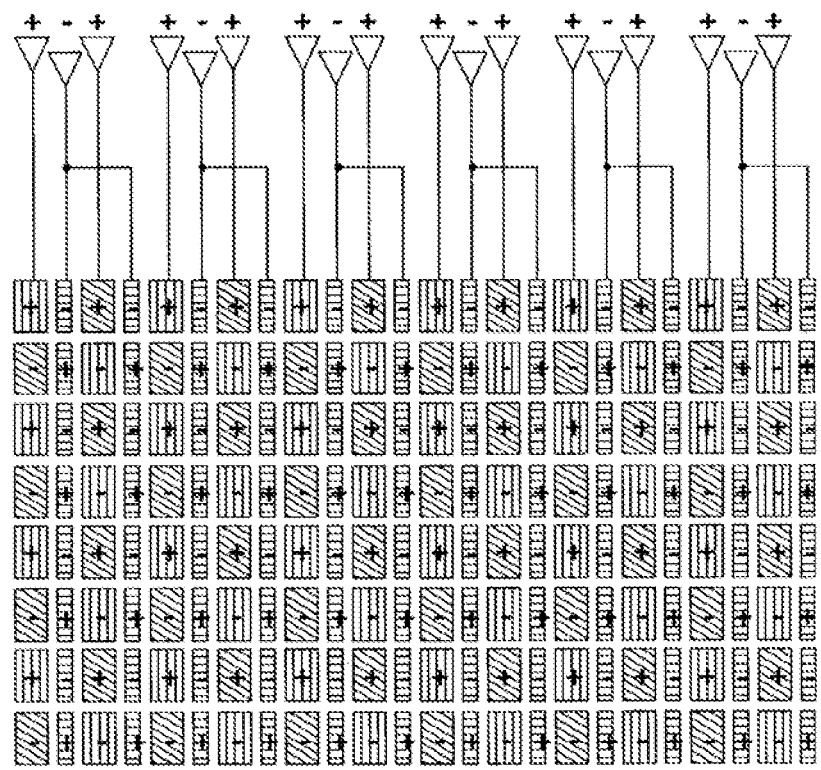

Inversion schemes, switching the electrical field polarity across the display cell to provide a time averaged zero net field and ion current across the cell can be used to the above unique sub-pixel arrangements. FIGS. 9 and 10 (matching FIG. 8A's schematic) and FIGS. 15 and 16 (matching FIG. 8B's schematic) show two "dot inversion" schemes—referred to as "2×1" and "1×1", respectively—on Active Matrix Liquid Crystal Displays, both of which will perform satisfactorily. The scheme shown on FIGS. 9 and 15 may perform better when slight imbalances of light transmission occur between positive and negative polarities, especially when the eye is tracking the motion of displayed images moving across the screen. Each of the Figures shows the polarities during half of the display addressing fields. The polarities are reversed for the other half, alternating every field, resulting in a net zero current (zero DC bias), as is well known in the art.

Figure 20:
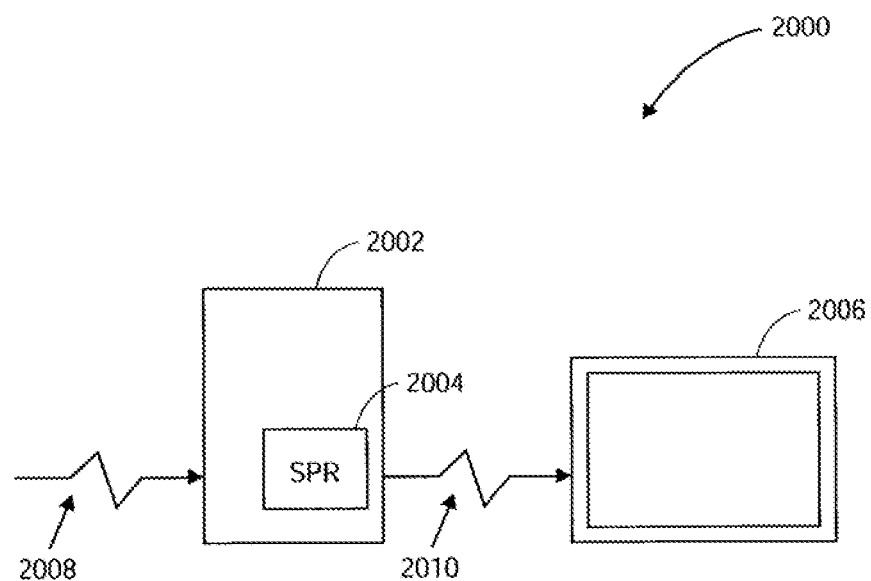
FIG. 20 depicts a system incorporating sub-pixel rendering techniques suitable to drive a panel made in accordance with the various embodiments described herein.

FIG. 20 depicts a system 2000 in which a display as constructed in accordance with the various embodiments disclosed herein is driven by a sub-pixel rendering technique 2004 which may be resident on a physical device 2002. An input image data stream 2008 may be input into the sub-pixel rendering technique 2004 and converted in the manner herein disclosed. An output image data stream 2010 is sent to the display device 2006 in order to drive the various sub-pixels to form an image thereupon. As discussed in several references incorporated herein, the sub-pixel rendering (SPR) technique 2004 may be implemented in either hardware and/or software or a combination thereof. For example, SPR techniques 2004 could be resident as logic (either hardware or software) on the display itself or it could reside on a graphics controller chip or board.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. For example, some of the embodiments above may be implemented in other display technologies such as Organic Light Emitting Diode (OLED), ElectroLumenscent (EL), Electrophoretic, Active Matrix Liquid Crystal Display (AMLCD), Passive Matrix Liquid Crystal display (AM-LCD), Incandescent, solid state Light Emitting Diode (LED), Plasma Display Panel (PDP), and Iridescent. Therefore, it is intended that the invention not be limited to the particular embodiment disclosed as the best mode contemplated for carrying out this invention, but that the invention will include all embodiments falling within the scope of the appended claims.

What is claimed is:

1. A display having a display area tessellated by repetition of a sub-pixel repeat group; the sub-pixel repeat group consisting of first through eighth selectively-actuatable light emitting subpixels (sp1-sp8);

wherein the first through third subpixels (sp1-sp3) of the sub-pixel repeat group are respectively configured to emit respective and different first, second and third colored lights (c1, c2, c3);

wherein the fourth, sixth and eighth subpixels (sp4, sp6, sp8) of the sub-pixel repeat group are respectively configured to emit the second colored light (c2);

wherein the fifth subpixel (sp5) of the sub-pixel repeat group is configured to emit the third colored light (c3);

wherein the seventh subpixel (sp7) of the sub-pixel repeat group is configured to emit the first colored light (c1);

wherein the first, third, fifth and seventh subpixels (sp1, sp3, sp5, sp7) are positioned within the layout pattern of the sub-pixel repeat group such that their corresponding first and third colored lights (c1, c3) substantially form a multi-rowed checkerboard pattern;

wherein at least the first, third, fifth and seventh subpixels (sp1, sp3, sp5, sp7) are individually selectively-actuatable;

wherein the second and sixth subpixels (sp2, sp6) are arranged in different rows and in a same column; and wherein the second, fourth, sixth and eighth subpixels (sp2, sp4, sp6, sp8) each has a size smaller than that of the first subpixel (sp1).

2. The display of claim 1, wherein the first colored light has a red color, the second colored light has a green color, and the third colored light has a blue color.

3. The display of claim 1, wherein the first colored light has a red color, the second colored light has a blue color, and the third colored light has a green color.

4. The display of claim 1, wherein the first colored light has a green color, the second colored light has a blue color, and the third colored light has a red color.

5. The display of claim 1 wherein the size of each of the second, fourth, sixth and eighth subpixels (sp2, sp4, sp6, sp8) is half the size of the first subpixel.

6. The display of claim 1, wherein the second subpixel (sp2) is interposed between the first and the third subpixels.

7. The display of claim 1, wherein the second and sixth subpixels (sp2, sp6) are disposed in a same column within the layout pattern of the sub-pixel repeat group.

8. The display of claim 7, wherein the second and sixth subpixels (sp2, sp6) which are disposed in the same column are respectively not fully in same respective rows as those in which the first and fifth subpixels (sp1, sp5) reside within the layout pattern of the sub-pixel repeat group but are instead shifted in a vertical direction with respect to the rows of the first and fifth subpixels.

* * * * *